(12) United States Patent
Haldemann

(10) Patent No.: US 8,884,486 B2
(45) Date of Patent: Nov. 11, 2014

(54) METHOD FOR REGULATING THE REACTIVE POWER GENERATED OR ABSORBED BY A SYNCHRONOUS ELECTRIC GENERATOR AND SYNCHRONOUS ELECTRIC GENERATOR

(75) Inventor: Johann Haldemann, Birr (CH)

(73) Assignee: Alstom Technology Ltd., Baden (CH)

( * ) Notice: Subject to any disclaimer, the term of this patent is extended or adjusted under 35 U.S.C. 154(b) by 882 days.

(21) Appl. No.: 13/031,670

(22) Filed: Feb. 22, 2011

(65) Prior Publication Data

US 2011/0210705 A1 Sep. 1, 2011

(30) Foreign Application Priority Data

Feb. 22, 2010 (EP) ..................................... 10154193

(51) Int. Cl.
*H02P 11/00* (2006.01)
*H02K 1/00* (2006.01)
*H02K 3/00* (2006.01)

(52) U.S. Cl.
USPC .............. 310/200; 310/191; 310/184; 322/20

(58) Field of Classification Search
USPC ...................... 322/20; 310/200, 191, 189, 184
See application file for complete search history.

(56) References Cited

U.S. PATENT DOCUMENTS

| | | | |
|---|---|---|---|
| 839,358 A * | 12/1906 | Alexanderson | 310/198 |
| 1,184,157 A * | 5/1916 | Andrews | 310/200 |
| 2,691,124 A * | 10/1954 | Aske | 318/773 |
| 3,233,159 A * | 2/1966 | Rawcliffe | 318/773 |
| 4,739,239 A * | 4/1988 | Krause et al. | 318/685 |
| 4,949,023 A * | 8/1990 | Shlien | 318/541 |
| 5,483,111 A * | 1/1996 | Kuznetsov | 310/12.21 |
| 5,821,660 A * | 10/1998 | Anderson | 310/184 |
| 6,331,760 B1 * | 12/2001 | McLane, Jr. | 318/767 |
| 6,414,412 B1 * | 7/2002 | Hao | 310/200 |
| 6,710,495 B2 * | 3/2004 | Lipo et al. | 310/184 |
| 2010/0019714 A1 * | 1/2010 | Fuchs | 318/524 |
| 2010/0025994 A1 | 2/2010 | Cardinal et al. | |

FOREIGN PATENT DOCUMENTS

DE  10 2007 037 181 A1  2/2009
EP  1 755 212 A2  2/2007

OTHER PUBLICATIONS

Search Report from European Patent Application No. 10154193.6, mailed on Aug. 19, 2010.
State Intellectual Property Office of People's Republic of China Search Report and Office Action of Application Serial No. 201110072561.9 for Alstom Technology Ltd. dated Mar. 17, 2014.
English Translation of State Intellectual Property Office of People's Republic of China Search Report and Office Action of Application Serial No. 201110072561.9 for Alstom Technology Ltd. dated Mar. 17, 2014.

* cited by examiner

*Primary Examiner* — Julio Gonzalez
(74) *Attorney, Agent, or Firm* — Buchanan Ingersoll & Rooney PC

(57) ABSTRACT

A method for regulating the reactive power generated or absorbed by a synchronous electric generator includes regulating a quantity of coils disposed in line with a stator winding. Additionally, a generator operating point of the generator is regulated.

12 Claims, 4 Drawing Sheets

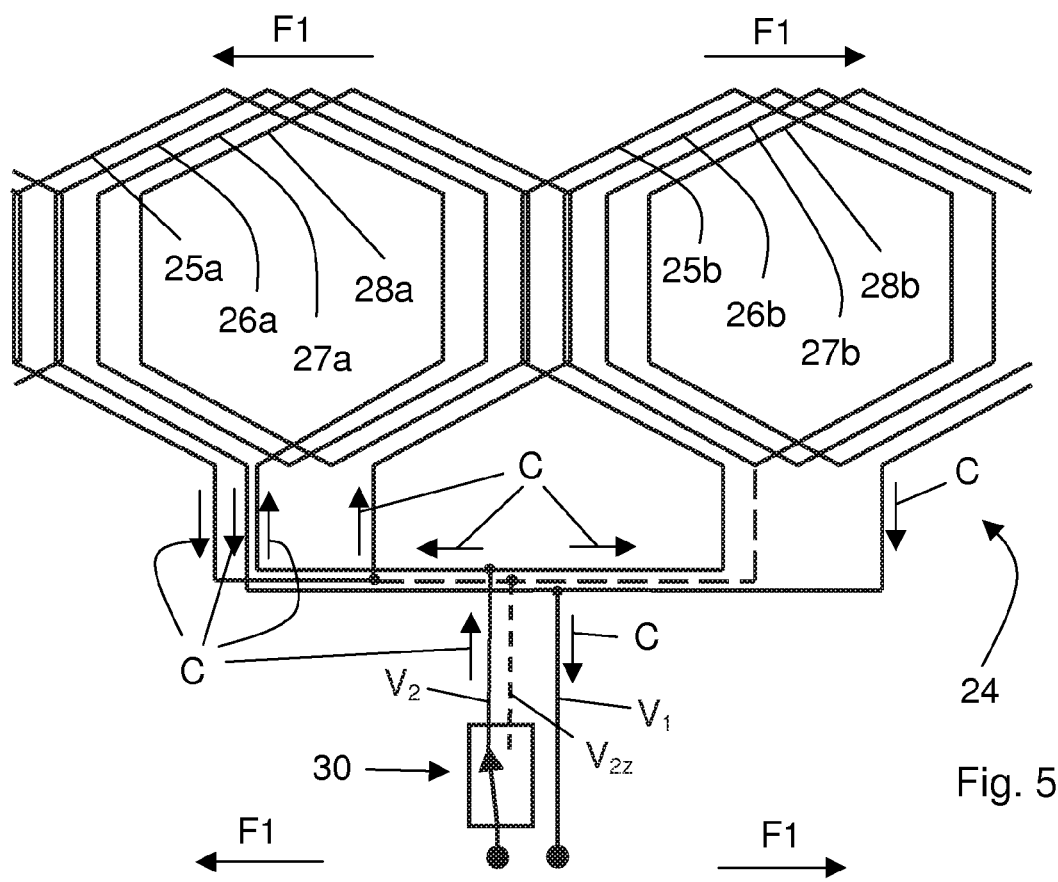
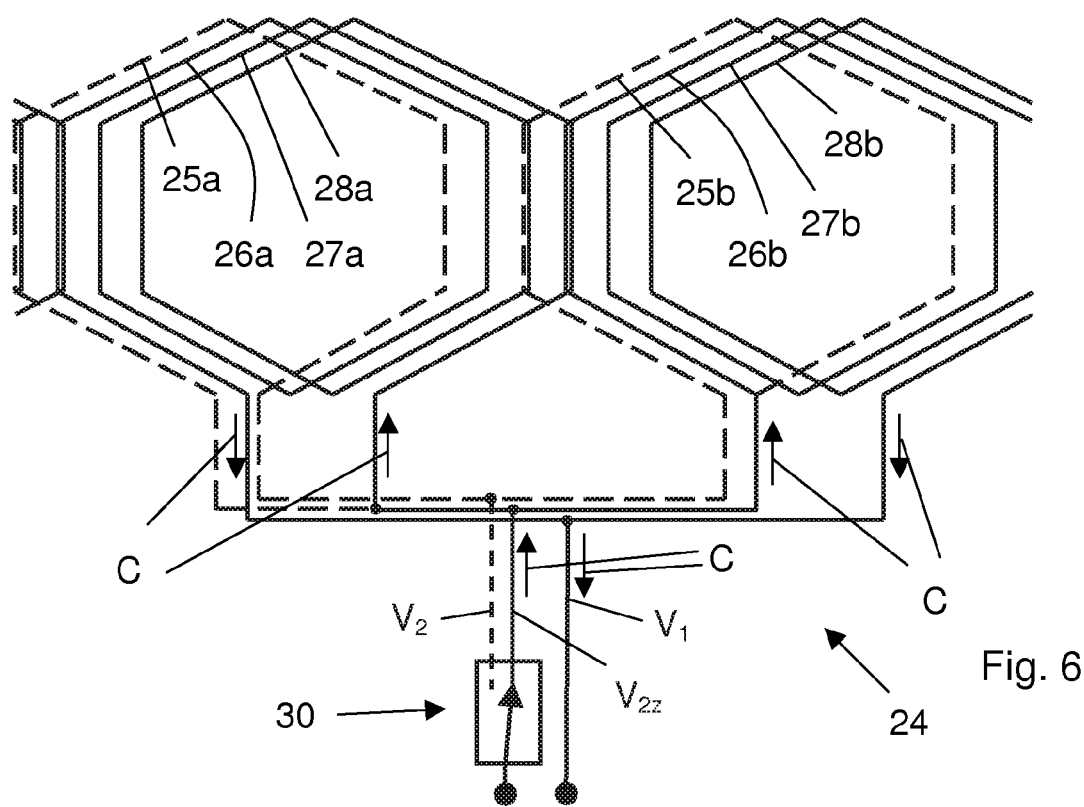

METHOD FOR REGULATING THE REACTIVE POWER GENERATED OR ABSORBED BY A SYNCHRONOUS ELECTRIC GENERATOR AND SYNCHRONOUS ELECTRIC GENERATOR

CROSS-REFERENCE TO PRIOR APPLICATIONS

Priority is claimed to European Patent Application No. EP 10 154 193.6, filed Feb. 22, 2010, the entire disclosure of which is hereby incorporated by reference herein.

FIELD

The present invention relates to a method for regulating the reactive power generated or absorbed by a synchronous electric generator and a synchronous electric generator.

BACKGROUND

In the following, reference is made to FIG. 1 that shows a typical power chart of a synchronous electric generator.

This power chart has a X axis defining the reactive power (per unit) and a Y axis defining the real power (also per unit). In particular it shows the generator operating limits defined by the rotor current 2, stator current 3 and stability limit 4; the stability limit 4 originates from a point 9 called short circuit ratio, in short SCR, that is a design parameter.

In addition, in case the prime motor is a turbine, also the turbine limit 5 is shown.

The stator current 6 (represented by a vector originating from the center 7 of the diagram) and the rotor or field current 8 (represented by a vector originating from the short circuit ratio (SCR)) converge to the generator operating point 10.

Loads connected to the grid may behave:
like electric resistances, in this case they absorb real power, but do not absorb reactive power;
like electric inductances, in this case they do not absorb real power, but do absorb reactive power; and
like electric capacitances, in this case they do not absorb real power, but do generate reactive power.

Typically, loads have a mixed behaviour, such that they absorb real power and, at the same time, also absorb or generate reactive power.

In particular, during normal operation, the electric grid has an overall resistive and inductive behaviour, such that real power and reactive power are absorbed by the electric grid; correspondingly the generators must provide real power and reactive power. This operation is usually called lagging power factor operation and corresponds to the operating point 10.

Real and reactive power absorbed by the grid vary during the year and, in some cases, also during the day; thus, regulation is needed.

In some cases (for example during the night) the real power absorbed by the electric grid decreases and, likewise, the reactive power absorbed by the electric grid also decreases; in some cases the electric grid starts to behave as a capacitance and generate reactive power.

When this occurs the generators connected to the grid must be able to absorb this reactive power.

In order to absorb reactive power from the grid, the operating point must be moved along the turbine limit 5 from point 10 toward the stability limit 4 (as indicated by arrow F), to bring the generators to the so called leading power factor operation.

This regulation is limited by the stability limit 4, because when the stability limit 4 is overcome the electric generator loses synchronism with the electric grid.

Therefore such a regulation has strict limits and only limited amounts of reactive power may be absorbed this way.

In order to be able to absorb a sufficient amount of reactive power, customers usually require generators to be manufactured that have a high design SCR 9, such that the stability limit 4 is far apart from the Y axis (in fact the larger the SCR, the larger the reactive power that can be generated regulating the operating point by moving it along the turbine limit 5 since the stability limit 4 comes out from the SCR).

Increase of SCR however causes the rotor or field current 8 to increase during normal operation (i.e. at the operating point 10); this causes an efficiency drop and an increase of the generator size.

SUMMARY

In an embodiment, the present invention provides a method for regulating the reactive power generated or absorbed by a synchronous electric generator. The method includes regulating a quantity of coils disposed in line with a stator winding. Additionally, a generator operating point of the generator is regulated.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following:

FIGS. 5, 6 show the winding of one single phase of a generator according to the first embodiment respectively in a first and second operating configuration.

DETAILED DESCRIPTION

An aspect of the present invention is to provide a method and a synchronous electric generator by which the problems of the prior art are eliminated.

In an embodiment, the present invention provides a method and synchronous electric generator having a large reactive power regulation window at leading power factor, without affecting generator operation at the rated operating point at lagging power factor.

It is also an aspect of the invention to provide a synchronous electric generator that is efficient and has limited dimensions.

In an embodiment, the present invention provides a method for regulating the reactive power generated by a synchronous electric generator which includes regulating the number of coils in line with the stator winding to regulate the SCR.

Lowering the number of coils lowers the reactance of the stator winding in a quadratic way and, since the SCR is approximately proportional to the square of the inverse of the number of coils (i.e. SCR~$1/n^2$, wherein: SCR is the short circuit ratio and n is the number of coils) this regulation allows the SCR to be regulated.

Figure 1:
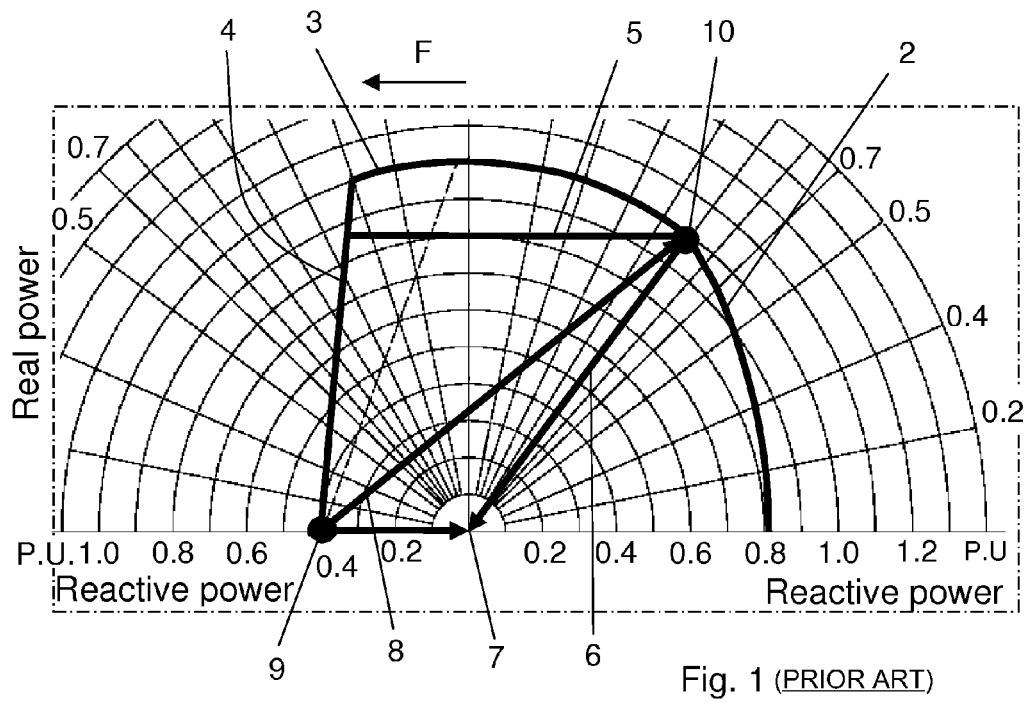
FIG. 1 is a power chart of a traditional synchronous electric machine.
Figure 2:
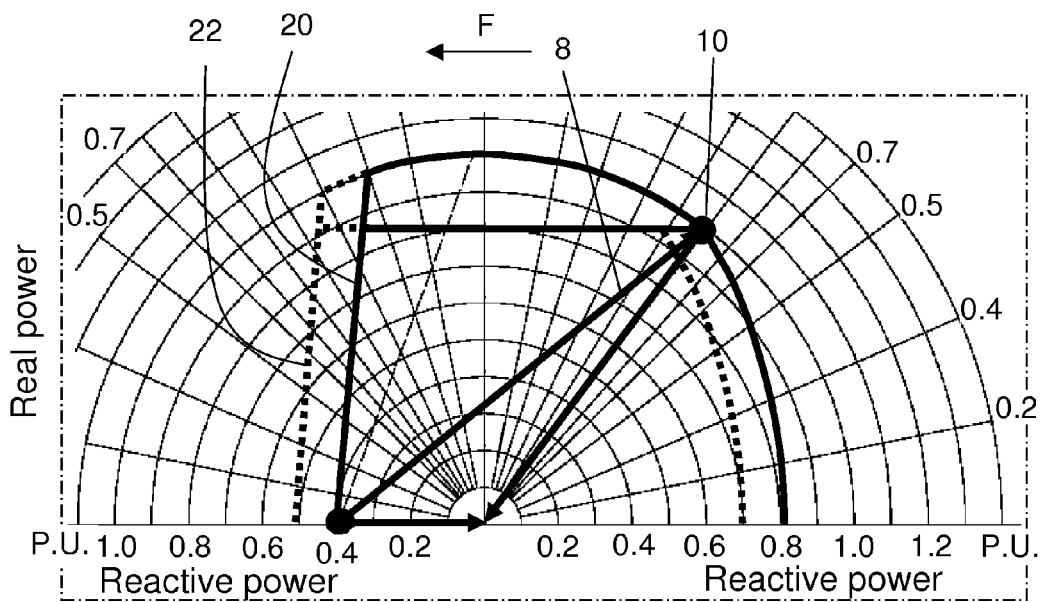
FIG. 2 is a power chart of a synchronous electric machine operated in accordance with an embodiment of the present invention.

In other words, as shown in FIG. 2, the generator has two power charts:

a first power chart 20 with all the coils in line with the stator winding; this power chart is the one typically used for operation at lagging power factor; and a second power chart 22 with a reduced number of coils in line with the stator winding; this power chart is typically used for operation at leading power factor.

Thus, the generator operating point may be regulated for operation at leading power factor to a large extent, with no risk of overcoming the stability limit (that would cause the generator to lose synchronism with the electric grid).

In other words, during normal operation at the rated operating point the generator operates at lagging power factor.

In this case, all the coils are in line with the winding and the power charts of the generator is the one identified by numeral reference 20; as shown, the operating conditions are optimized for operation at lagging power factor (operating point 10) since the rotor or field current 8 are low and optimized for operation at lagging power factor.

Then, when reactive power must be absorbed by the generator, the generator is driven to operate at least temporarily at leading power factor.

For example, regulation of the generator operating point is a traditional regulation and is achieved by regulating the rotor or field current.

While operating at leading power factor the number of coils in line with the stator winding is reduced to increase the SCR.

When this occurs the power chart of the generator becomes the one identified by the reference number 22; i.e. the power chart moves laterally such that the SCR increases and the stability limit 4 moves laterally as indicated by the arrow F.

Since the stability limit 4 moves laterally (toward the left part of the diagram in FIG. 2, as indicated by arrow F) the regulation range of the reactive power is increased.

Naturally, when the generator must be brought back from leading power factor operation to lagging power factor operation, the operating point is regulated in a traditional way and is made to move along turbine limit 5 in a direction opposite arrow F (while operating with power chart 22); then, when the stability limit 4 of the diagram 20 is overcome, the number of coils in line with the stator winding is increased, to switch from power chart 22 (optimized for operation at leading power factor) to power chart 20 (optimised for operation at lagging power factor).

Preferably, the number of coils in line with the stator winding is reduced or increased by one coil; in addition, the number of coils of each and every phase of the generator and the number of coils of each and every pole of the generator is regulated.

The generator comprises a stator having an annular shape and a rotor rotatable within the stator (features well known in the art and not shown in the attached drawings).

Figure 3:
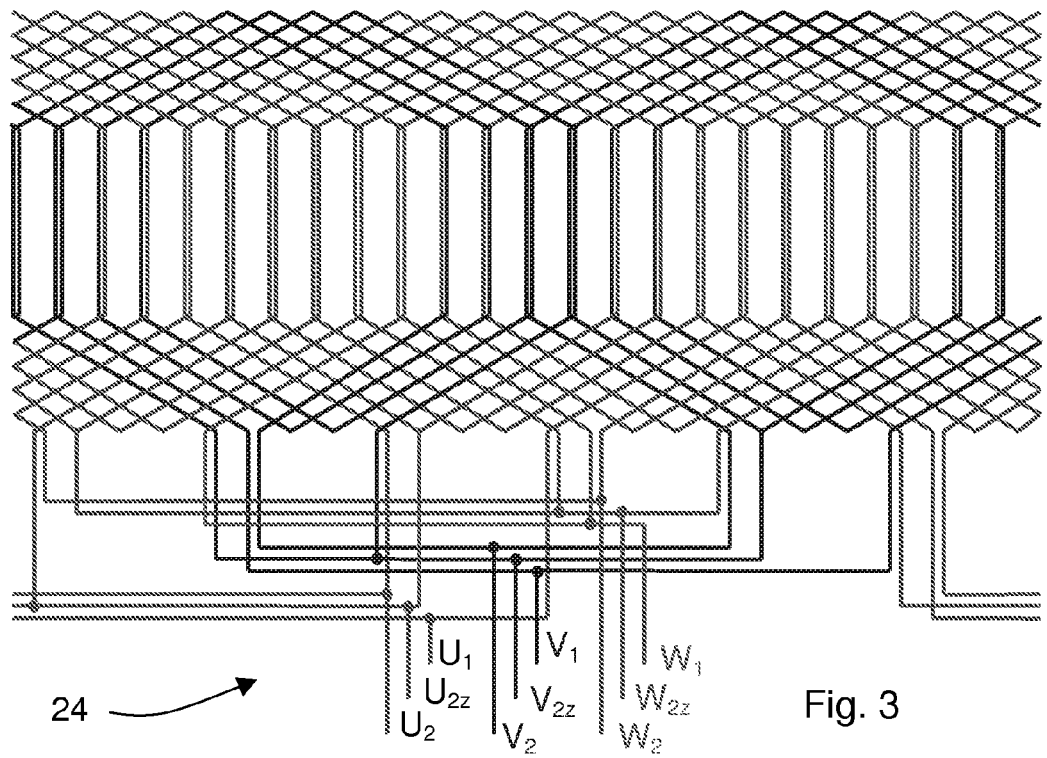
FIGS. 3, 4 respectively show the winding of a generator in a first and second embodiment of the present invention.
Figure 4:
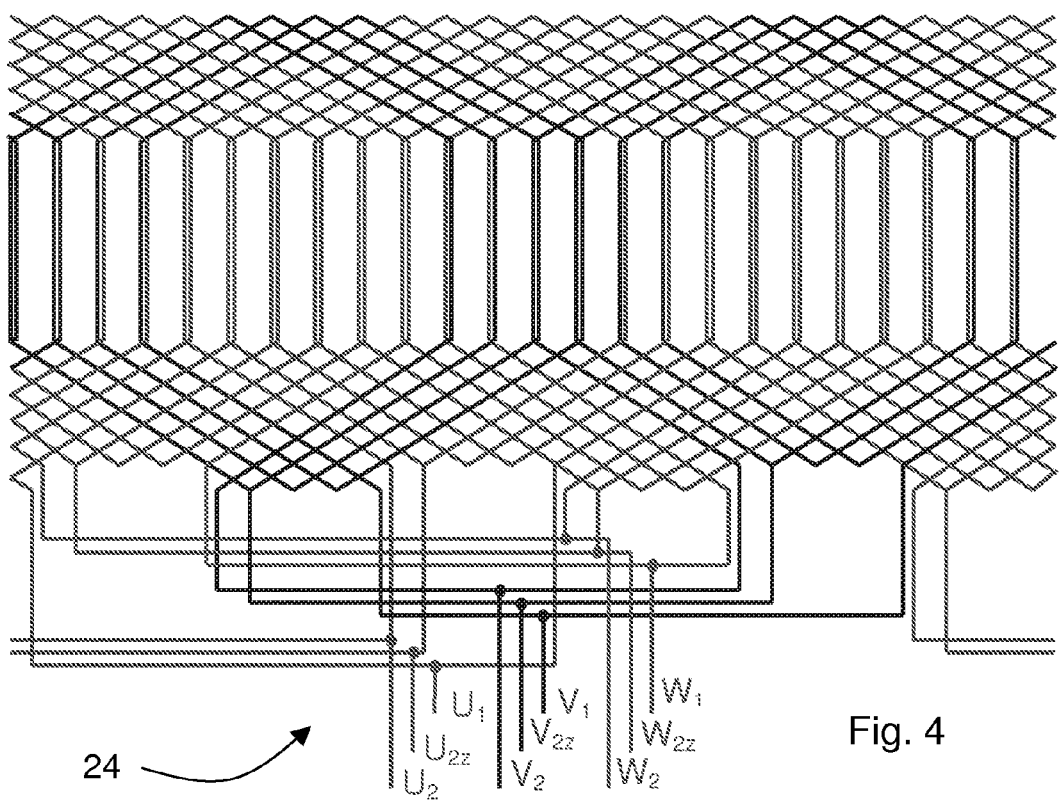
Figure 7:
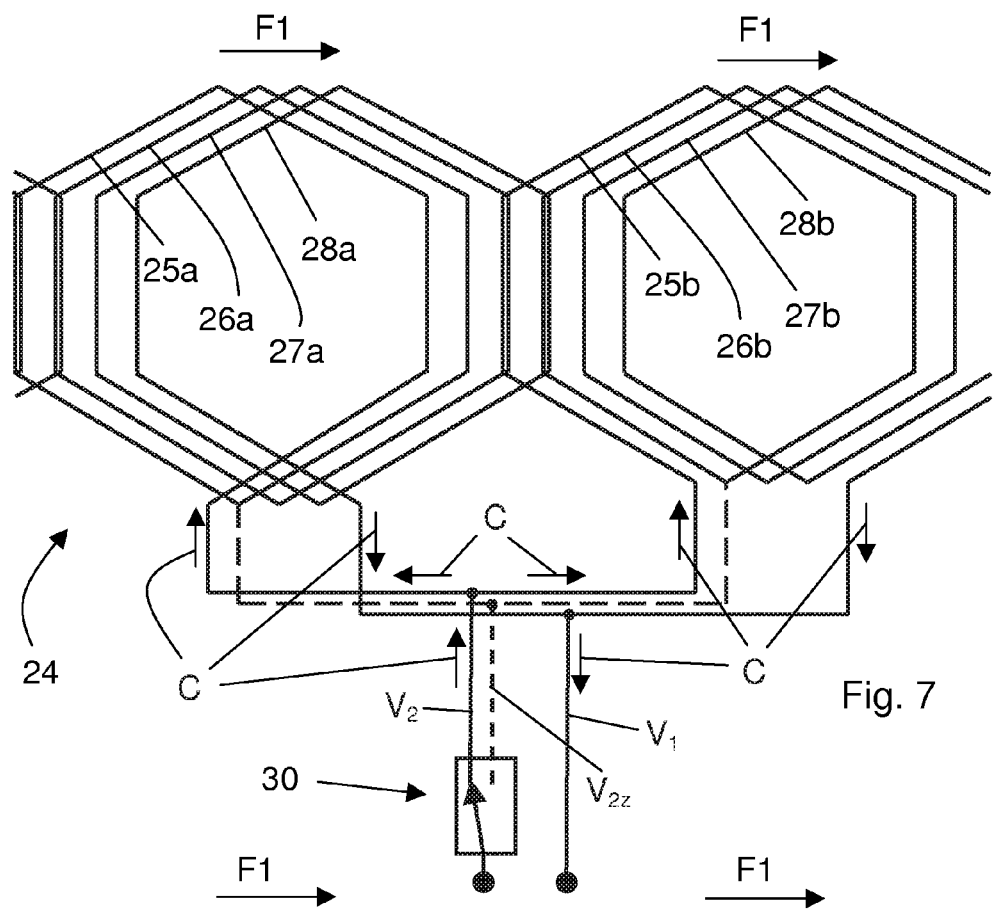
FIGS. 7, 8 show the winding of one single phase of a generator according to the second embodiment respectively in a first and second operating configuration.
Figure 8:
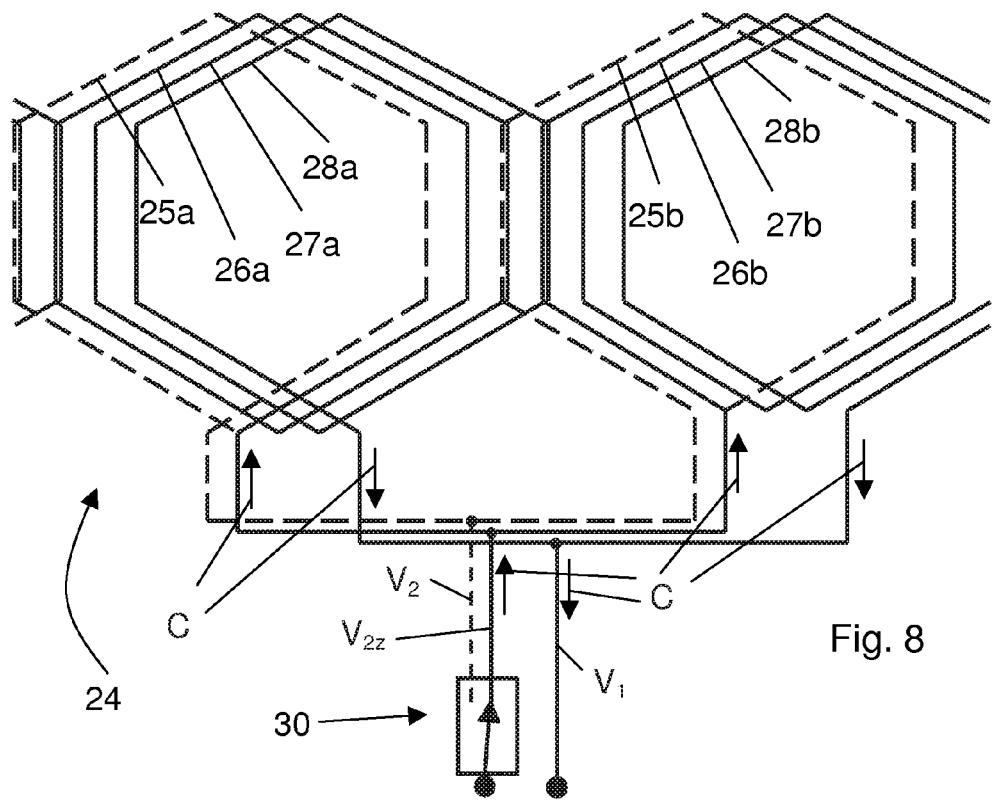

The stator has a winding 24 having three phases U, V, W; FIG. 3 shows the stator winding with all three phases in a first embodiment of the invention and FIGS. 5, 6 show only one phase V of the same embodiment. In addition, FIG. 4 shows the stator winding with all three phases in a second embodiment of the invention and FIGS. 7, 8 show only one phase V of the same embodiment. In particular, for sake of clarity, in these figures only four coils 25a, 26a, 27a, 28a and 25b, 26b, 27b, 28b for each pole and for each phase are shown.

In these figures, reference $V_1$ indicates the phase output, references $V_2$ indicates the star point of the winding with all coils in line with the stator winding (i.e. the coil end to be star connected to the coil ends of the other phases) and reference $V_{2z}$ indicates the star point of the winding with a reduced number of coils in line with the stator winding.

The generator comprises switches 30 for regulating the number of coils 25a, 26a, 27a, 28a and 25b, 26b, 27b, 28b in line with the stator winding 24 and traditional devices for regulating the generator operating point for example by modifying the rotor or field current; other devices for regulating the operating point may be used according to the particular needs.

Preferably, the switches 30 are provided at the star point $V_2/V_{2z}$ (where voltage is zero); in different embodiments (according to the particular configuration of the coils) switches may also be provided at the voltage terminals $V_1$ in addition or instead of those at the star points $V_2/V_{2z}$.

In different embodiments, the switches 30 are similar to high voltage tap changers (mechanical switches) or electronic switches.

FIG. 3 (showing all three phases U, V and W) and FIGS. 5, 6 (that only show one phase V) show a first embodiment of the generator.

FIG. 5 shows operation with all coils 25a, 26a, 27a, 28a and 25b, 26b, 27b, 28b in line with the stator winding; arrows C show the direction of circulation of the currents in these coils, in addition solid lines represent portions of the stator winding wherein current circulates and dashed lines portions of the winding where no current circulates.

FIG. 6 shows operation only with coils 26a, 27a, 28a and 26b, 27b, 28b in line with the stator winding (i.e. coils 25a and 25b are out of line); arrows C show the direction of circulation of the currents in these coils, solid lines represent portions of the winding wherein current circulates and dashed lines portions of the winding where no current circulates.

As shown, in this embodiment the coils advance in opposite directions, i.e. the current circulating in the windings passes in sequence through coils switched in opposite directions; for sake of clarity arrows F1 indicate the direction along which the coils advance.

FIG. 4 (showing all three phases U, V and W) and FIGS. 7, 8 (that only show one phase V) show a second embodiment of the generator.

In particular FIG. 7 shows operation with all coils 25a, 26a, 27a, 28a and 25b, 26b, 27b, 28b in line with the stator winding; arrows C show the direction of circulation of the currents in these coils, solid lines represent portions of the winding wherein current circulates and dashed lines portions of the winding where no current circulates.

FIG. 8 shows operation only with coils 26a, 27a, 28a and 26b, 27b, 28b in line (i.e. coil 25a and 25b are out of line); arrows C show the direction of circulation of the currents in these coils, solid lines represent portions of the winding wherein current circulates and dashed lines portions of the winding where no current circulates.

As shown, in this embodiment the coils of each pole advance in the same directions; also in this case arrows F1 indicate the direction along which the coils advance.

This embodiment is particularly simple and cheap (for example it requires a lower number of connecting rings when compared to the first embodiment described).

Advantageously, the electric generator has a regular number of parallel stator winding paths, i.e. two pole generator: 1 or 2; four pole generator 1 or 2 or 4).

This regulation allows a large reactive power regulation window at leading power factor to be achieved (since SCR is large), without affecting generator operation at the rated operating point at lagging power factor (since at the rated operating point the rotor or field current is low).

In addition, since rotor or field current at the rated operating point is low the electric generator is efficient and has limited dimensions.

Naturally the features described may be independently provided from one another.

In practice the materials used and the dimensions can be chosen at will according to requirements and to the state of the art.

While the invention has been particularly shown and described with reference to preferred embodiments thereof, it will be understood by those skilled in the art that various changes in form and details may be made therein without departing from the spirit and scope of the invention.

Reference Numbers
- 2 rotor current
- 3 stator current
- 4 stability limit
- 5 turbine limit
- 6 stator current
- 7 centre of diagram
- 8 rotor or field current
- 9 SCR—short circuit ratio
- 10 generator operating point at rated load
- 20 first power chart
- 22 second power chart
- 24 stator winding
- 25a, 26a, 27a, 28a, 25b, 26b, 27b, 28b coils
- 30 switches
- U, V, W phases
- C current
- F direction along which operating point is moved
- F1 direction along which coils advance

What is claimed is:

1. A method for regulating the reactive power generated or absorbed by a synchronous electric generator, the method comprising:
    regulating a quantity of coils disposed in line with a stator winding;
    regulating a generator operating point of the generator; and
    operating the generator at least temporarily at a leading power factor, wherein the regulating of the quantity of coils is performed during the operation of the generator at the leading power factor such that a number of coils in line with the stator winding is reduced or increased; and
    wherein the regulation of the quantity of coils reduces the number of coils in line with the stator winding when the generator operates at the leading power factor to absorb reactive power such that the generator has less coils in line with the stator winding when the generator operates at the leading power factor as compared to when the generator operates at a lagging power factor and wherein the regulating of the quantity of the coils increases the number of coils in line with the stator winding when the generator is operating at the lagging power factor as compared to when the generator operates at the leading power factor.

2. The method as recited in claim 1, wherein the regulating of the quantity of coils includes adjusting the quantity by one coil.

3. The method as recited in claim 1, wherein the regulating the quantity of coils is performed for each phase of the generator.

4. The method as recited in claim 3, wherein the regulating the quantity of coils is performed for each pole of the generator.

5. The method as recited in claim 1, wherein the regulating of the generator operating point includes regulating to a rated operating point so as to operate the generator at a lagging power factor.

6. A synchronous electric generator, comprising:
    at least one switch configured to regulate a quantity of coils disposed in line with a stator winding; and
    a device configured to regulate a generator operating point of the generator;
    the switch configured to regulate the quantity of the coils when the generator is operating at a leading power factor such that a number of coils in line with the stator winding is reduced or increased when the generator is operating at the leading power factor,
    wherein the switch is configured to regulate the quantity of the coils when the generator is operating at a leading power factor such that a number of coils in line with the stator winding when the generator is operating at the leading power factor is less than the number of coils in line with the stator winding when the generator is operating at a lagging power factor so that the generator is configured to absorb reactive power when operating at the leading power factor.

7. The generator of claim 6, wherein the switch is also configured to regulate the quantity of the coils when the generator is operating at the lagging power factor so that the quantity of coils in line with the stator winding is greater than the quantity of coils in line with the stator winding when the generator operates at the leading power factor.

8. The generator of claim 7, wherein the switch is configured to increase the quantity of coils in line with the stator winding when the generator is to operate at the lagging power factor to decrease a short circuit ratio of the generator and the switch is configured to decrease the quantity of coils in line with the stator winding when the generator is to operate at the leading power factor to increase the short circuit ratio.

9. The generator of claim 6, wherein the stator winding is comprised of three phases.

10. The generator of claim 6, wherein the at least one switch is comprised of a plurality of switches.

11. A method for regulating the reactive power generated or absorbed by a synchronous electric generator, the method comprising:
    regulating a quantity of coils disposed in line with a stator winding;
    regulating a generator operating point of the generator; and
    operating the generator at least temporarily at a leading power factor, wherein the regulating of the quantity of coils is performed during the operation of the generator at the leading power factor such that a number of coils in line with the stator winding is reduced or increased; and
    wherein the quantity of the coils is regulated so that the quantity of coils in line with the stator winding when the generator operates at the lagging power factor is greater than the quantity of coils in line with the stator winding when the generator operates at the leading power factor so that a short circuit ratio of the generator is larger when the generator operates at the leading power factor as compared to when the generator operates at the lagging power factor such that the generator is configured to absorb reactive power when operating at the leading power factor.

12. A method for regulating the reactive power generated or absorbed by a synchronous electric generator, the method comprising:

regulating a quantity of coils disposed in line with a stator winding;

regulating a generator operating point of the generator; and operating the generator at least temporarily at a leading power factor, wherein the regulating of the quantity of coils is performed during the operation of the generator at the leading power factor such that a number of coils in line with the stator winding is reduced or increased; and wherein all the coils are in line with the stator winding when the generator operates at a lagging power factor and the quantity of the coils in line with the stator winding are reduced when the generator operates at the leading power factor such that a short circuit ratio of the generator is a smaller value when the generator operates at the lagging power ratio as compared to the value of the short circuit ratio when the generator operates at the leading power factor so that the generator is configured to absorb reactive power when operating at the leading power factor.

\* \* \* \* \*